(12) United States Patent
Cooley et al.

(10) Patent No.: US 8,352,559 B1
(45) Date of Patent: Jan. 8, 2013

(54) METHOD AND APPARATUS FOR MANAGING TEMPORARY E-MAIL ADDRESSES

(75) Inventors: Shaun Cooley, El Segundo, CA (US); Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 508 days.

(21) Appl. No.: 12/415,897

(22) Filed: Mar. 31, 2009

(51) Int. Cl.
G06F 15/16 (2006.01)

(52) U.S. Cl. .................. 709/206; 709/207; 709/203

(58) Field of Classification Search .................. None
See application file for complete search history.

(56) References Cited

U.S. PATENT DOCUMENTS

| | | | | |
|---|---|---|---|---|
| 6,389,455 | B1 * | 5/2002 | Fuisz | 709/206 |
| 7,197,539 | B1 * | 3/2007 | Cooley | 709/206 |
| 7,546,349 | B1 * | 6/2009 | Cooley | 709/206 |
| 2002/0138581 | A1 * | 9/2002 | MacIntosh et al. | 709/206 |
| 2003/0083889 | A1 * | 5/2003 | Macklin | 705/1 |
| 2003/0233577 | A1 * | 12/2003 | Bellino | 713/201 |
| 2004/0236784 | A1 * | 11/2004 | Chien-Yuan | 707/104.1 |
| 2006/0106914 | A1 * | 5/2006 | Plow et al. | 709/206 |
| 2007/0067400 | A1 * | 3/2007 | Kawakami et al. | 709/206 |
| 2007/0113101 | A1 * | 5/2007 | LeVasseur et al. | 713/189 |
| 2009/0137225 | A1 * | 5/2009 | Costanzo et al. | 455/405 |
| 2010/0228831 | A1 * | 9/2010 | Landesmann | 709/206 |

* cited by examiner

*Primary Examiner* — Wing F Chan
*Assistant Examiner* — Kostas Katsikis
(74) *Attorney, Agent, or Firm* — Wilmer Cutler Pickering Hale and Dorr LLP

(57) ABSTRACT

Method and apparatus for managing temporary e-mail addresses is described. All e-mail sent to a temporary e-mail address is initially forwarded to an actual e-mail address. In some examples, the temporary e-mail address is automatically deactivated in response to an event such that no e-mail sent to the temporary e-mail address is forwarded to the actual e-mail address. A notification e-mail is sent to the actual e-mail address, the notification e-mail indicating that the temporary e-mail address has been deactivated and including one or more uniform resource locators (URLs) configured to manage the deactivation of the temporary e-mail address.

18 Claims, 2 Drawing Sheets

METHOD AND APPARATUS FOR MANAGING TEMPORARY E-MAIL ADDRESSES

BACKGROUND OF THE INVENTION

1. Field of the Invention

The present invention relates generally to computer systems. More particularly, the present invention relates to a method and apparatus for managing temporary e-mail addresses.

2. Description of the Related Art

Users of the Internet typically obtain an e-mail address for use in sending and receiving electronic mail (e-mail). When browsing the World Wide Web (WWW), a user may be required to submit an e-mail address to web services for various purposes, such as signing up for an account, ordering goods or services, etc. Users may find it undesirable to use their actual e-mail address for all such queries for fear of receiving unauthorized e-mail (e.g., spam e-mail). Thus, services have been developed through which a user can interact to receive a temporary e-mail address. The temporary e-mail address is dynamically provisioned (e.g., on demand when requested by a web site) and is associated with an actual e-mail address of the user. E-mail sent to the temporary e-mail address is forwarded to the actual e-mail address of the user. The temporary e-mail address is typically associated with bounding conditions, such as a term of use. After the term of use expires, the temporary e-mail address is deactivated. In this manner, the user can protect his or her actual e-mail address. The user may obtain many temporary e-mail addresses in this manner.

One disadvantage associated with the temporary e-mail address is the automatic deactivation thereof without notification. A user may be unaware that a temporary e-mail address has expired and still be relying on such temporary e-mail address to receive e-mail. However, once deactivated, the temporary e-mail address will no longer forward e-mail to the user's actual e-mail address. This creates the situation where the user never receives e-mail they desire to receive.

Accordingly, there exists a need in the art for a method and apparatus for managing temporary e-mail addresses that overcome the aforementioned deficiencies.

SUMMARY OF THE INVENTION

Aspects of the invention relate to a method, apparatus, and computer readable medium for managing a temporary e-mail address, where all e-mail sent to the temporary e-mail address is initially forwarded to an actual e-mail address. In some embodiments, the temporary e-mail address is automatically deactivated in response to an event such that no e-mail sent to the temporary e-mail address is forwarded to the actual e-mail address. A notification e-mail is sent to the actual e-mail address, the notification e-mail indicating that the temporary e-mail address has been deactivated and including one or more uniform resource locators (URLs) configured to manage the deactivation of the temporary e-mail address.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
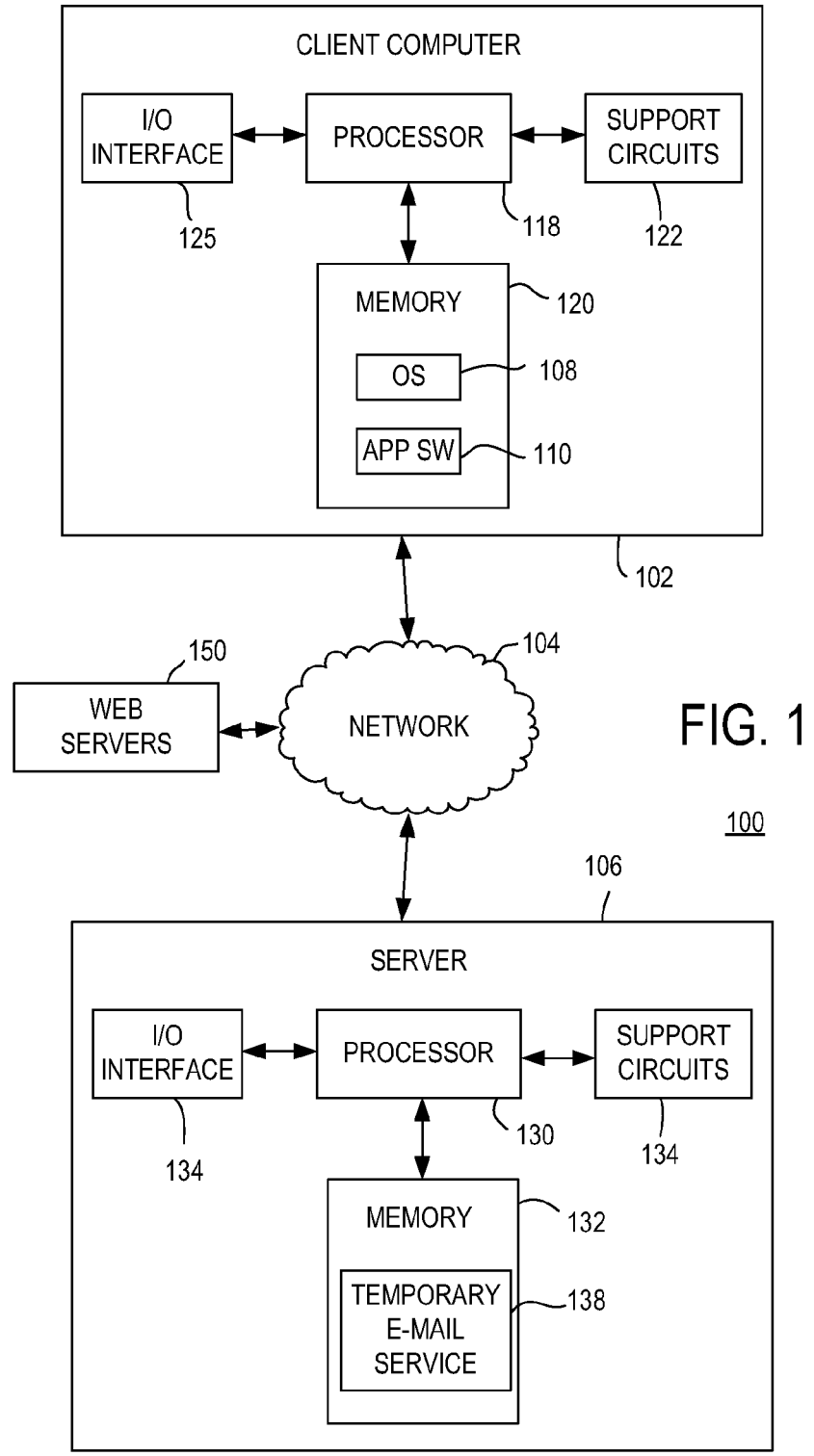
FIG. 1 is a block diagram depicting an exemplary embodiment of a computer system 100 in accordance with one or more aspects of the invention.

FIG. 1 is a block diagram depicting an exemplary embodiment of a computer system 100 in accordance with one or more aspects of the invention. The system 100 includes a client computer 102, a network 104, and a server computer 106. The network 104 comprises a communication system that connects computer systems by wire, cable, fiber optic, and/or wireless links facilitated by various types of well-known network elements, such as hubs, switches, routers, and the like. In particular, the network 104 may connect the client computer 102 and the server computer 106. The network 104 may employ various well-known protocols to communicate information. For example, the network 104 may employ internet protocol (IP), transmission control protocol (TCP), and the like for the transmission of packets. The network 104 may comprise part of a wide area network (WAN), such as the Internet, and/or all or part of a local area network (LAN).

The client computer 102 illustratively includes a processor 118, a memory 120, various support circuits 122, an I/O interface 125. The processor 118 may include one or more microprocessors known in the art. The support circuits 122 for the processor 118 include conventional cache, power supplies, clock circuits, data registers, I/O interfaces, and the like. The I/O interface 125 may be configured for communication with the network 104. The memory 120 may include one or more of the following random access memory, read only memory, magneto-resistive read/write memory, optical read/write memory, cache memory, magnetic read/write memory, and the like.

The client computer 102 includes an operating system (OS) 108 and application software 110. The OS 108 may be any type of operating system known in the art, such as any MICROSOFT WINDOWS, APPLE MACINTOSH, or like type operating systems known in the art. The application software 110 may include any of a myriad of programs configured for execution within the operating system 108. Notably, the application software 110 may include a browser client configured to browse the World Wide Web (WWW) on web servers 150 coupled to the network 104 (the browser may also be referred to as an "Internet Browser"). Exemplary browsers include MICROSOFT INTERNET EXPLORER, MOZILLA FIREFOX, and APPLE SAFARI. The application software 110 may further include an e-mail client for sending and receiving e-mail over the network 104. Exemplary e-mail clients include MICROSOFT OUTLOOK, LOTUS NOTES, and the like.

The server 106 illustratively includes a processor 130, a memory 132, various support circuits 134, an I/O interface 136. The processor 130 may include one or more microprocessors known in the art. The support circuits 134 for the processor 130 include conventional cache, power supplies, clock circuits, data registers, I/O interfaces, and the like. The I/O interface 136 may be configured for communication with the network 104. The memory 132 may include one or more of the following random access memory, read only memory, magneto-resistive read/write memory, optical read/write memory, cache memory, magnetic read/write memory, and the like.

The server 106 is configured with a temporary e-mail service 138. The temporary e-mail service 138 is configured to manage dynamic provisioning of temporary e-mail addresses for users, e.g., a user of the client computer 102. A temporary e-mail address is configured such that all e-mail sent to the temporary e-mail address is forwarded to an actual e-mail address. A temporary e-mail address may also be referred to as a "disposable e-mail address". The temporary e-mail service 138 can be configured to provision temporary e-mail addresses based on one or more predefined domains. That is, all e-mail addresses provisioned for the predefined domain(s) are deemed to be temporary e-mail addresses. An "actual e-mail address" is an e-mail address assigned to any other domain not associated with temporary e-mail addresses.

For example, assume a user of the client computer 102 has been assigned an actual e-mail address of user@some-domain.com. The user, via the application software 110, may interact with the temporary e-mail service 138 to obtain a temporary e-mail address, such as abc5www123@service-domain.com. The user may request the temporary e-mail address in a dynamic manner, such as when filling a web form requiring an e-mail address. The temporary e-mail service 138 can return the temporary e-mail address to the application software 110, e.g., by filling the e-mail address on a web form with the temporary e-mail address. The domain "service-domain.com" can be a predefined domain to which temporary e-mail addresses are defined. The username "abc5www123" can be a dynamically assigned identifier selected by the temporary e-mail service 138. The assigned identifier can have any format compliant with e-mail service requirements. The temporary e-mail service 138 configures the address abc5www123@service-domain.com such that all e-mails sent thereto are forward to the e-mail address user@some-domain.com. The user can request any number of temporary e-mail addresses in this fashion.

The temporary e-mail service 138 is configured to provision each temporary e-mail address until a specified event occurs. For example, the temporary e-mail service 138 may provision a temporary e-mail address with one or more bounding conditions, such as a term of use (e.g., a specified number of days, weeks, months, etc. for which the temporary e-mail address will forward e-mail). When an event occurs that triggers a bounding condition (e.g., the term of use expires), the temporary e-mail service 138 deactivates the specified temporary e-mail address. In some embodiments, as described further below, the temporary e-mail service 138 is configured to send a notification to the user when a temporary e-mail address provisioned for the user is deactivated. The notification can allow the user to interact with the temporary e-mail service 138 to manage the deactivation of the temporary e-mail address. Thus, the user has the opportunity to manage the deactivation, including the opportunity to reactivate the address, rather than have the temporary e-mail address deactivate automatically without any notice.

Figure 2:
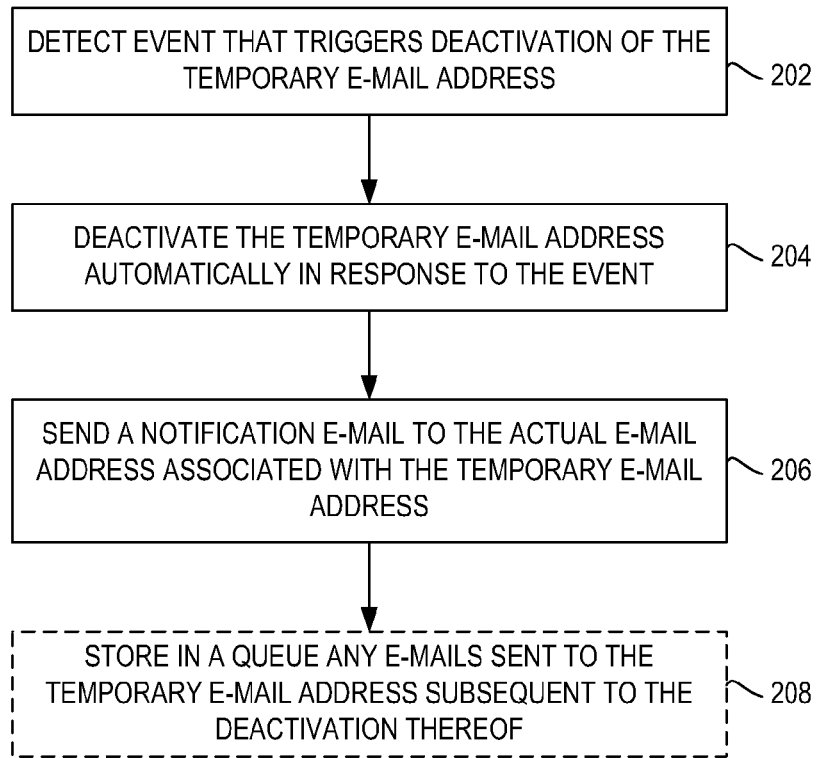
FIG. 2 is a flow diagram depicting a method for managing a temporary e-mail address according to some embodiments of the invention.

FIG. 2 is a flow diagram depicting a method 200 for managing a temporary e-mail address according to some embodiments of the invention. The method 200 may be performed by the temporary e-mail service 138 described above in FIG. 1. Assume for purposes of exposition that temporary e-mail service 138 has provisioned a temporary e-mail address. At step 202, the temporary e-mail service 138 detects an event that triggers deactivation of the temporary e-mail address. For example, the temporary e-mail address may have a specific term of use. The event may be the expiration of the term of use.

At step 204, the temporary e-mail service 138 deactivates the temporary e-mail address automatically in response to the event. When the temporary e-mail address is deactivated, no e-mail sent to the temporary e-mail address is forwarded to the actual e-mail address associated therewith. At step 206, the temporary e-mail service 138 sends a notification e-mail to the actual e-mail address associated with the temporary e-mail address. The notification e-mail indicates that the temporary e-mail address has been deactivated. The notification e-mail may include one or more uniform resource locators (URLs) that allow the user to manage the deactivation of the temporary e-mail address. The notification e-mail may have many forms. For example, the notification e-mail may include a text explanation of the deactivation of the temporary e-mail address. The text explanation may express the reason for the deactivation (e.g., expiration of the term of use). The text explanation may express instructions for further managing the temporary e-mail address, including use of the URL(s) included in the notification e-mail. The URLs may include a URL for reactivating the temporary e-mail address, a URL for renewing one or more bounding conditions, such as renewing a term of use, a URL for confirming deactivation, and/or like type management functions.

At optional step 208, the temporary e-mail service 138 can store in a queue any e-mails sent the temporary e-mail address subsequent to the deactivation thereof. The temporary e-mail service 138 may continue to store e-mail in the queue until a specified condition, such as expiration of a particular period of time or in response to further management by the user through the URL(s) in the notification. For example, the user may reactivate the temporary e-mail address in response to the notification, at which time the temporary e-mail service 138 can send any e-mail in the queue to the actual e-mail address associated with the temporary e-mail address. In another example, the user may confirm deactivation of the temporary e-mail address, at which time the temporary e-mail service 138 can discard any e-mail in the queue or deliver any e-mail in the queue to the actual e-mail address as a final action. In some embodiments, the notification e-mail may include a URL that allows the user to obtain any e-mail in the queue regardless of whether the user chooses to reactivate the temporary e-mail address or confirm deactivation.

The method 200 may be repeated to deactivate and notify for various temporary e-mail addresses assigned to various users as events occur that dictate automatic deactivation. Although the temporary e-mail address has been described as being associated with a single actual e-mail address, it is to be understood that the temporary e-mail address may be associated with multiple actual e-mail addresses. In such case, the notification may be sent to multiple actual e-mail addresses.

Figure 3:
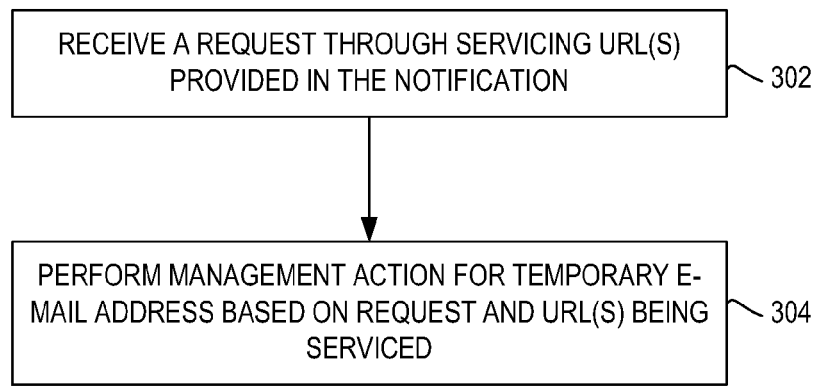
FIG. 3 is a flow diagram depicting a method of servicing one or more URLs included in a deactivation notification for a temporary e-mail address according to some embodiments of the invention.

FIG. 3 is a flow diagram depicting a method 300 of servicing one or more URLs included in a deactivation notification for a temporary e-mail address according to some embodiments of the invention. The method 300 may be performed by the temporary e-mail service 138 shown in FIG. 1. Assume that the temporary e-mail service 138 has provisioned a temporary e-mail address and has thereafter deactivated the temporary e-mail address according to the method 200 described above. Thus, a notification has been sent to the actual e-mail address associated with the temporary e-mail address.

At step 302, the temporary e-mail service 138 receives a request through servicing at least one URL provided in the notification. In some embodiments, the URL(s) in the notification may include authentication data embedded therein.

Thus, if the temporary e-mail service 138 requires authentication of the user before allowing management of the temporary e-mail address, the URL(s) may include the authentication data. At step 304, the temporary e-mail service 138 performs a management action based on the request and the URL(s) being serviced. For example, the temporary e-mail service 138 may service a URL for obtaining e-mail stored in a queue, as described above. In response to the request, the temporary e-mail service 138 may send any e-mail in the queue to the actual e-mail address. In another example, the temporary e-mail service 138 may service a URL for reactivating the temporary e-mail address. In response to the request, the temporary e-mail service 138 may reactivate the temporary e-mail address based on new bounding conditions (e.g., a new term of use). In another example, the temporary e-mail service 138 may service a URL for confirming deactivation of the temporary e-mail address. Those skilled in the art will appreciate that temporary e-mail service 138 may service other types of URLs for different types of management requests. Also, a particular URL may cause more than one action to be taken. For example, a URL may cause delivery of e-mail in the queue, as well as reactivating or confirming deactivation of the temporary e-mail address.

Aspects of the methods described above may be implemented as a program product for use with a computer system. Program(s) of the program product defines functions of embodiments and can be contained on a variety of computer readable media, which include, but are not limited to: (i) information permanently stored on non-writable storage media (e.g., read-only memory devices within a computer such as CD-ROM or DVD-ROM disks readable by a CD-ROM drive or a DVD drive); and (ii) alterable information stored on writable storage media (e.g., floppy disks within a diskette drive or hard-disk drive or read/writable CD or read/writable DVD). Such computer readable media, when carrying computer-readable instructions that direct functions of the invention, represent embodiments of the invention.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of managing a temporary e-mail address, where all e-mail sent to the temporary e-mail address is initially forwarded to an actual e-mail address, the method comprising:
    deactivating the temporary e-mail address automatically in response to an event such that no e-mail sent to the temporary e-mail address is forwarded to the actual e-mail address;
    sending a notification e-mail to the actual e-mail address, the notification e-mail indicating that the temporary e-mail address has been deactivated and including one or more uniform resource locators (URLs) configured to manage the deactivation of the temporary e-mail address; and
    storing, in a queue, one or more e-mails sent to the temporary e-mail address subsequent to the deactivation of the temporary e-mail address, wherein the one or more e-mails sent to the temporary e-mail address subsequent to the deactivation of the temporary e-mail address are accessible to a user of the temporary e-mail address.

2. The method of claim 1, wherein the URLs in the notification e-mail include a first URL configured to obtain the one or more e-mails stored in the queue.

3. The method of claim 2, further comprising:
    receiving a request in response to servicing the first URL; and
    sending the one or more e-mails stored in the queue to the actual e-mail address in response to the request.

4. The method of claim 1, wherein the URLs in the notification e-mail include at least one URL for performing at least one of: reactivating the temporary e-mail address or renewing terms of use for the temporary e-mail address.

5. The method of claim 4, wherein the notification e-mail includes a text explanation of the deactivation of the temporary e-mail address including a reason for such deactivation.

6. The method of claim 4, further comprising:
    receiving a request in response to servicing the at least one URL; and
    reactivating the temporary e-mail address in response to the request such that all e-mail sent to the temporary e-mail address is forwarded to the actual e-mail address.

7. The method of claim 1, wherein the URLs include authentication data embedded therein.

8. An apparatus for managing a temporary e-mail address, where all e-mail sent to the temporary e-mail address is initially forwarded to an actual e-mail address, the apparatus comprising:
    at least one computer processor;
    electronic memory storing executable instructions causing the at least one computer processor to:
        deactivate the temporary e-mail address automatically in response to an event such that no e-mail sent to the temporary e-mail address is forwarded to the actual e-mail address;
        send a notification e-mail to the actual e-mail address, the notification e-mail indicating that the temporary e-mail address has been deactivated and including one or more uniform resource locators (URLs) configured to manage the deactivation of the temporary e-mail address; and
    electronic storage for storing, in a queue, one or more e-mails sent to the temporary e-mail address subsequent to the deactivation of the temporary e-mail address, wherein the one or more e-mails sent to the temporary e-mail address subsequent to the deactivation of the temporary e-mail address are accessible to a user of the temporary e-mail address.

9. The apparatus of claim 8, wherein the URLs in the notification e-mail include a first URL configured to obtain the one or more e-mails stored in the queue.

10. The apparatus of claim 9, wherein the instructions further cause the at least one computer processor to:
    receive a request in response to servicing the first URL; and
    send the one or more e-mails stored in the queue to the actual e-mail address in response to the request.

11. The apparatus of claim 8, wherein the URLs in the notification e-mail include at least one URL for performing at least one of: reactivating the temporary e-mail address or renewing terms of use for the temporary e-mail address.

12. The apparatus of claim 11, wherein the notification e-mail includes a text explanation of the deactivation of the temporary e-mail address including a reason for such deactivation.

13. The apparatus of claim 11, wherein the instructions further cause the at least one computer processor to:
    receive a request in response to servicing the at least one URL; and reactivate the temporary e-mail address in response to the request such that all e-mail sent to the temporary e-mail address is forwarded to the actual e-mail address.

14. A non-transitory computer readable storage medium having instructions stored thereon that when executed by a processor cause the processor to perform a method of managing a temporary e-mail address, where all e-mail sent to the temporary e-mail address is initially forwarded to an actual e-mail address, the method comprising:

deactivating the temporary e-mail address automatically in response to an event such that no e-mail sent to the temporary e-mail address is forwarded to the actual e-mail address;

sending a notification e-mail to the actual e-mail address, the notification e-mail indicating that the temporary e-mail address has been deactivated and including one or more uniform resource locators (URLs) configured to manage the deactivation of the temporary e-mail address; and storing, in a queue, one or more e-mails sent to the temporary e-mail address subsequent to the deactivation of the temporary e-mail address, wherein the one or more e-mails sent to the temporary e-mail address subsequent to the deactivation of the temporary e-mail address are accessible to a user of the temporary e-mail address.

15. The non-transitory computer readable storage medium of claim 14, wherein the URLs in the notification e-mail include a first URL configured to obtain the one or more e-mails stored in the queue.

16. The non-transitory computer readable storage medium of claim 15, further comprising:

receiving a request in response to servicing the first URL; and sending the one or more e-mails stored in the queue to the actual e-mail address in response to the request.

17. The non-transitory computer readable storage medium of claim 14, wherein the URLs in the notification e-mail include at least one URL for performing at least one of: reactivating the temporary e-mail address or renewing terms of use for the temporary e-mail address.

18. The non-transitory computer readable storage medium of claim 17, further comprising:

receiving a request in response to servicing the at least one URL; and reactivating the temporary e-mail address in response to the request such that all e-mail sent to the temporary e-mail address is forwarded to the actual e-mail address.

* * * * *